July 14, 1942.   A. DE L. SINDEN   2,290,077
CONVEYING ELEMENT
Filed July 26, 1940
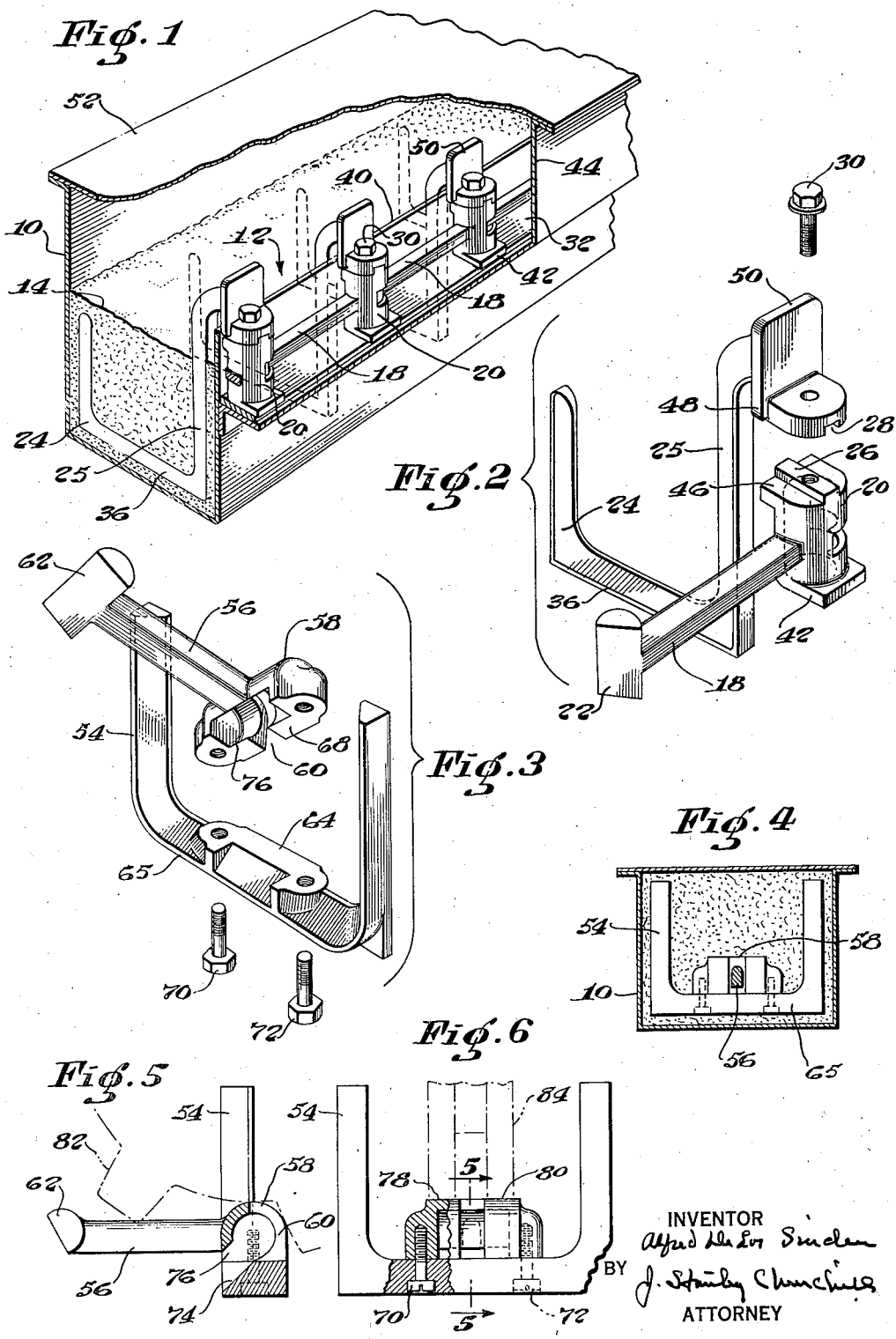
INVENTOR
Alfred De Los Sinden
BY J. Stanley Churchill
ATTORNEY Patented July 14, 1942

2,290,077

UNITED STATES PATENT OFFICE 2,290,077

CONVEYING ELEMENT

Alfred De Los Sinden, Aurora, Ill., assignor to Redler Conveyor Company, Quincy, Mass., a corporation of Massachusetts Application July 26, 1940, Serial No. 347,803

9 Claims. (Cl. 198—176)

This invention relates to a conveying element and particularly to a conveying element for use in a conveyer for conveying flowable solid material.

The invention has for an object to provide a novel and improved conveying element made up of a plurality of pivotally connected links having detachable flights which may be readily removed and replaced with flights of a different size or style resulting in economy of production, convenience in installation, and adaptability to various operation conditions.

With this general object in view and such others as may hereinafter appear, the invention consists in the conveying element and in the various structures, arrangements and combinations of parts hereinafter described and particularly defined in the claims at the end of this specification.

In the drawing illustrating the preferred embodiments of the invention, Fig. 1 is a perspective view of a conveyer with portions broken away, illustrating a conveying element embodying the present invention; Fig. 2 is a perspective detail view of one unit of the detachable conveying element illustrated in Fig. 1 showing the parts detached; Fig. 3 is a perspective detail view similar to Fig. 2 illustrating a modified form of the invention; Fig. 4 is a cross-sectional view of a conveyer employing the flights shown in Fig. 3; and Figs. 5 and 6 are detail views in side and front elevation respectively of the unit shown in Fig. 3, some of the parts being broken away and shown in cross-section.

In general, the present invention contemplates an improvement in the structure of a conveying element of the general type employed in a conveyer for conveying flowable solid material, such for example, as is illustrated and described in the United States Patents to Sinden, No. 2,154,707, April 18, 1939, and No. 2,155,874, April 25, 1939, in which the flowable solid material is drawn through a casing by a conveying element having a plurality of spaced flights, preferably of open structure, and which are pivotally connected together by a tension element or connection between the flights. In the preferred embodiment of the invention, each flight may and preferably will be detachably connected to the tension element whereby flights of different style and design may be interchangeably attached to be easily and economically replaced. The novel construction to the conveying element herein disclosed also lends itself to standardization and uniformity in the production of the various parts of the conveying element with the resultant advantages flowing therefrom.

Referring now to the drawing which illustrates the preferred embodiments of the invention, and particularly to Figs. 1 and 2, the embodiment of the invention therein shown illustrates a conveying element particularly adapted for use in a conveyer for conveying materials in curved paths lying substantially in the same plane, such conveyer being disclosed in the Sinden Patent No. 2,155,874, above referred to. As herein illustrated, the conveyer includes a casing or trough 10 which may extend in a general rectangular path having the corners curved, and which is provided with a conveying element 12 of open structure capable of being moved therethrough to effect the conveyance of solid flowable material 14 through the casing in a continuous stream.

In accordance with the present invention, the conveying element 12 is made up of a plurality of pivotally and preferably detachably connected links including a tension element 18, each link being of the construction illustrated in detail in Fig. 2. As therein shown, each tension link 18 is provided at one end with a slotted hub 20 of general cylindrical shape and at the other end with a lug or boss 22 which is adapted to be received within the hollow hub 20 of the next succeeding link of the tension element. The tensioning element is provided with a plurality of individual U-shaped flight members 24 of open construction, one arm 25 of each U-shaped member being longer than the other and extending above the level of the material in the casing 10. A flight member 24 is connected to the top of each hub portion 20 of the tension links by a horizontally extended tongue and groove connection 26, 28, and by a bolt 30. As herein shown, the tensioning element 18 is supported in a separate trough 32 mounted on one side wall of the casing 10 and the tensioning element is arranged to travel therethrough with the cylindrical hub portions 20 disposed vertically, as illustrated. An elongated rail 34 is provided in the bottom of the trough 32 along which the bottom end of the cylindrical hub is arranged to slide. In practice, the trough 32 is disposed at a level such as to suspend the bottom arm 36 of the U-shaped flight above the bottom of the casing 10. As illustrated in Fig. 2, the lower end of each hub 20 is provided with a flanged portion 42 which is arranged to engage the inner surface of the wall 44 of the trough 32, and the upper end of each hub 20 is provided with a flanged portion 46 on the opposite side of the hub which is contiguous with a similar portion 48 provided on each adjacent flight and which is arranged to bear against the opposing wall of the trough 32 which comprises the wall 40 of the trough 10. A vertically extended portion 50 also provided on each flight is arranged to overhang the top edge of the wall 40. As herein shown, a cover 52 extends across the top of both conduits 10 and 32, and it will be observed that the top of the extended portion 50 is disposed adjacent the under surface of the cover in order to prevent vertical displacement of the conveying element.

In the embodiment of the invention thus far described, it will be observed that the construction of the present conveying element enables the individual flight members 24 to be easily and quickly replaced in the event that one becomes broken or the flight members may be changed to provide others of a different size, style, or shape, without removing the tension element. In practice, the clearance space between the walls of the casing and the legs of the flight members is varied for different materials according to the consistency of the material being run. Thus, where a user has occasion to run different grades of material through the conveyer at different times, the conveyer may be quickly adapted to run such material by simply changing the detachable flights to provide different clearance space as required.

Referring now to Figs. 3 to 6, inclusive, the embodiment of the invention therein shown illustrates a conveying element particularly adapted for use in a conveyer of the type illustrated in the Sinden Patent No. 2,154,707, for conveying flowable solid material through horizontal, vertical or angular paths. In such conveyers, the conveying element, including the tensioning element, is buried in the material being conveyed. As herein shown, in accordance with the present invention, the conveying element comprises a plurality of U-shaped flights 54 arranged to be connected together by tension links 56 provided at one end with a cylindrical hub 58 having a slotted portion 60 and provided at its other end with a lug or boss 62 which is adapted to be received within the hollow hub 58 of the next succeeding link of the tension element. As illustrated in detail in Fig. 3, each flight member 54 is provided with a boss 64 intermediate the ends of the lower arm 66 of the U-shaped flight which corresponds with a boss 58 provided at the hollow end of the tension link, and as shown in Figs. 5 and 6, the flights are connected to the tension element by bolts 70, 72. As shown in Fig. 5, each flight is provided with a cut out portion 76 at the end of the slot 60 in the tension link for receiving the lug 62 of the succeeding link. The cylindrical hub 58 of the tension links is provided with surfaces 78, 80 adapted to be received between the teeth 82 of a double sprocket for driving the conveying element, as illustrated in dotted lines in Figs. 5 and 6.

From the above description it will be observed that the present invention enables the flight members to be detachably mounted upon the pivotally and preferably detachably connected tension links resulting in a convenience to the user and enabling the parts to be standardized to effect an economy in production to the manufacturer.

While the preferred embodiments of the invention have been herein illustrated and described, it will be understood that the invention may be embodied in other forms within the scope of the following claims.

Having thus described the invention, what is claimed is:

1. For use in a conveyer for conveying flowable solid materials, a conveying element comprising a tension element including a plurality of pivotally and detachably connected links each having a transversely extended hollow hub at one end and an enlargement at the other end adapted to be substantially wholly received in the hollow hub of an adjacent link, and a plurality of individual spaced flight members detachably connected to said links at a point adjacent to and substantially in alignment with the pivotal connection of said links.

2. For use in a conveyer for conveying flowable solid materials, a conveying element comprising a tension element including a plurality of pivotally and detachably connected links each having an elongated transversely extended hollow hub at one end and an enlargement at the other end adapted to be fitted in the hollow hub of an adjacent link and a plurality of individual transversely extended flight members of open construction detachably connected to said links at a point adjacent to and substantially in alignment with the pivotal connection of said links.

3. For use in a conveyer for conveying flowable solid materials, a conveying element comprising a tension element including a plurality of pivotally and detachably connected links each having a transversely extended hollow hub at one end and an enlargement at the other end adapted to be substantially wholly received in the hollow hub of an adjacent link and a plurality of individual transversely extended flight members of open construction detachably connected to said links adjacent said hollow hub portions and substantially in alignment with the latter.

4. A conveying element comprising a tension element including a plurality of pivotally and detachably connected links each having a hollow hub at one end and an enlargement at the other end adapted to be received substantially wholly within the hollow hub of an adjacent link, a plurality of spaced U-shaped flight members having corresponding vertical legs of unequal length, and means for detachably connecting the longer legs of said flight members to the hollow hub portions of said tension element.

5. A conveying element comprising a tension element including a plurality of pivotally and detachably connected links each having a hollow hub at one end and an enlargement at the other end adapted to be substantially wholly received within the hollow hub of an adjacent link, a plurality of spaced U-shaped flight members, and means for detachably connecting one leg of said flight members to the hollow hub portions of said tension element.

6. A conveying element comprising a tension element including a plurality of pivotally and detachably connected links each having a vertically disposed hollow hub at one end and an enlargement at the other end adapted to be received within the hollow hub of an adjacent link, a plurality of spaced U-shaped flight members, and means for detachably connecting one leg of said flight members to the top of said vertically disposed hollow hub portions of said tension element.

7. A conveying element comprising a tension element including a plurality of pivotally and detachably connected links each having a transversely extended hollow hub at one end and an enlargement at the other end adapted to be substantially wholly received within the hollow hub of an adjacent link, a plurality of transversely extended U-shaped open flights, and means for detachably connecting the transverse portion of said U-shaped flights to the hollow hub portions of said tension element.

8. A conveying element comprising a tension element including a plurality of pivotally and detachably connected links each having a transversely extended and horizontally disposed hollow hub at one end and an enlargement at the other end adapted to be substantially wholly received within the hollow hub of an adjacent link, a plurality of transversely extended U-shaped open flights, and means for detachably connecting said hollow hub portions to said U-shaped flights at a point disposed substantially centrally of the transverse portion of said flights.

9. A conveying element comprising a tension element including a plurality of pivotally and detachably connected links each having a transversely extended hollow hub and a slotted portion at one end and an enlargement at the other end adapted to be received within the hollow hub of an adjacent link, a plurality of transversely extended U-shaped open flights, and means for detachably connecting the transverse portion of said U-shaped flights to the hollow hub portions of said tension element, the transverse portions of said U-shaped flights being provided with a cut-away portion at the end of the slotted portion of said tension links to permit entry into the hollow hub of the enlargement of an adjacent tension link.

ALFRED DE LOS SINDEN.